(12) United States Patent
Kim et al.

(10) Patent No.: US 11,945,968 B2
(45) Date of Patent: Apr. 2, 2024

(54) ANTI-FINGERPRINT FILM FOR AUTOMOBILE INTERIOR PARTS CONTAINING FLUORINE-BASED COMPOUND AND METHOD OF MANUFACTURING SAME

(71) Applicants: Hyundai Motor Company, Seoul (KR); Kia Corporation, Seoul (KR)

(72) Inventors: Hyun Jung Kim, Seoul (KR); Jae Sik Seo, Gyeonggi-do (KR); Ho Tak Jeon, Gyeonggi-Do (KR); Hee Do Kim, Gyeonggi-Do (KR); Hyun Don Kim, Gyeongsangnam-Do (KR); Seong Uk Juen, Gyeongsangnam-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/081,363

(22) Filed: Dec. 14, 2022

(65) Prior Publication Data
US 2024/0043697 A1    Feb. 8, 2024

(30) Foreign Application Priority Data

Aug. 8, 2022    (KR) .................. 10-2022-0098320

(51) Int. Cl.
| | |
|---|---|
| C09D 5/00 | (2006.01) |
| B32B 7/12 | (2006.01) |
| B32B 27/08 | (2006.01) |
| B32B 27/30 | (2006.01) |
| B32B 27/32 | (2006.01) |

(Continued)

(52) U.S. Cl.
CPC .............. *C09D 5/00* (2013.01); *B32B 7/12* (2013.01); *C09D 5/002* (2013.01); *C09D 151/08* (2013.01); *B32B 27/08* (2013.01); *B32B 27/304* (2013.01); *B32B 27/308* (2013.01); *B32B 27/32* (2013.01); *B32B 27/36* (2013.01); *B32B 27/365* (2013.01); *B32B 2255/10* (2013.01); *B32B 2255/26* (2013.01); *B32B 2307/412* (2013.01); *B32B 2307/536* (2013.01); *B32B 2307/584* (2013.01); *B32B 2605/003* (2013.01)

(58) Field of Classification Search
None
See application file for complete search history.

(56) References Cited

U.S. PATENT DOCUMENTS

| | | | |
|---|---|---|---|
| 10,696,865 B2 | 6/2020 | Ito et al. | |
| 2010/0304113 A1* | 12/2010 | Chang .................. | C09D 175/16 427/508 |

FOREIGN PATENT DOCUMENTS

| | | |
|---|---|---|
| JP | 6491394 B2 | 3/2019 |
| KR | 10-2009-0056913 A | 6/2009 |

(Continued)

OTHER PUBLICATIONS

Translation of KR 20090129107 A (Year: 2009).*

*Primary Examiner* — Ramsey Zacharia
(74) *Attorney, Agent, or Firm* — Fox Rothschild LLP (57) ABSTRACT

Disclosed are an anti-fingerprint film for automobile interiors and methods of producing the same. The anti-fingerprint film for automobile interior parts may include a base layer and an outermost layer located on the base layer including a fluorine-based compound, thus reducing the attachment area of the fingerprint composed of water and oil by virtue of the outermost layer having high water and oil repellency, ultimately removing fingerprint visibility.

9 Claims, 5 Drawing Sheets

(51) Int. Cl.
*B32B 27/36* (2006.01)
*C09D 151/08* (2006.01)

(56) References Cited

FOREIGN PATENT DOCUMENTS

| | | |
|---|---|---|
| KR | 10-1045282 B1 | 6/2011 |
| KR | 10-1276497 B1 | 6/2013 |
| KR | 10-1927271 B1 | 12/2018 |
| WO | 2016/020766 A1 | 2/2016 |

* cited by examiner

ANTI-FINGERPRINT FILM FOR AUTOMOBILE INTERIOR PARTS CONTAINING FLUORINE-BASED COMPOUND AND METHOD OF MANUFACTURING SAME

CROSS-REFERENCE TO RELATED APPLICATION

This application claims, under 35 U.S.C. § 119(a), the benefit of priority from Korean Patent Application No. 10-2022-0098320, filed on Aug. 8, 2022, the entire contents of which are incorporated herein by reference.

TECHNICAL FIELD

The present disclosure relates to an anti-fingerprint film for automobile interiors including a fluorine-based compound and a method of producing the same.

BACKGROUND

Black high-gloss specifications, which are decorative parts, are often applied to automobiles. In recent automobiles, black high-gloss has been applied to a surface material for electronic interior parts such as touchscreens and the like. Although black high-gloss is relatively cost-competitive and is capable of realizing luxuriousness, there is no treatment on the surface, and as such, there is a disadvantage in that fingerprints remain as white stains on the black high-gloss film and are thus highly visible in contrast to black color, which is the background color.

Therefore, it is necessary to develop an anti-fingerprint coating for automobile interior parts that may be applied to the black high-gloss film under the background described above.

SUMMARY

In preferred aspects, provided are an anti-fingerprint film for interior parts of a vehicle including a fluorine-based compound, which is capable of reducing fingerprint visibility by minimizing the surface attachment area of the fingerprint composed of water and sebum (oil) components due to high water and oil repellency, and a method of producing the same.

A term "fluorine-based compound" as used herein refers to a compound having a structure including one or more fluorines, which functions as active groups for chemical properties. In particular, the one or more fluorines may constitute greater than about 10% by mass, greater than about 20% by mass, greater than about 30% by mass, greater than about 40% by mass, greater than about 50% by mass, greater than about 55% by mass, greater than about 60% by mass, greater than about 65% by mass, greater than about 70% by mass, greater than about 75% by mass, greater than about 80% by mass, greater than about 85% by mass, greater than about 90% by mass, or greater than about 95% by mass of the total molecular mass of the compound.

The objects of the present disclosure are not limited to the foregoing. The objects of the present disclosure will be able to be clearly understood through the following description and to be realized by the means described in the claims and combinations thereof.

In an aspect, provided is an anti-fingerprint film including a base layer and an outermost layer located on the base layer and including a fluorine-based compound.

The anti-fingerprint film may further include a printing layer located under the base layer, a binder layer located under the printing layer, and a film layer located under the binder layer.

The base layer may include one or more selected from the group consisting of a polycarbonate (PC) film, a poly(methyl methacrylate) (PMMA) film, a polycarbonate/poly(methyl methacrylate) coextrusion film, and a polyethylene terephthalate (PET)-based film.

The fluorine-based compound may suitably include an ultraviolet (UV) curable resin.

The fluorine-based compound may include a copolymer of perfluoropolyether (PFPE) with (meth)acrylate.

The fluorine-based compound may include one or more selected from the group consisting of 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, α-trifluoromethyl methacrylate, and α-trifluoroethyl methacrylate.

The outermost layer may suitably include an amount of about 15 to 45 wt % of a urethane acrylate oligomer, an amount of about 10 to 70 wt % of an acrylate monomer, an amount of about to 3 wt % of the fluorine-based compound, an amount of about 0.03 to 0.4 wt % of a silicone resin, 0.08 to 3 wt % of a nanometal oxide, an amount of about 0.07 to 15 wt % of a photoinitiator, and 0.15 to 1.5 wt % of a stabilizer, based on the total weight of the outermost layer.

The term "nanometal oxide" as used herein refers to a particular form of substance including a metal component (e.g., alkali metals, alkali earth metals, or transition metals) combined with one or more oxygen atoms, and the particle has a size range in nanometer scale, for example, having diameters ranges of about 1 to 999 nm, of about 1 to 900 nm, of about 1 to 800 nm, of about 1 to 700 nm, of about 1 to 600 nm, of about 1 to 500 nm, of about 1 to 400 nm, of about 1 to 300 nm, of about 1 to 200 nm, of about 1 to 100 nm, or particularly, of about 5 to 100 nm. The metal oxide may be formed by stable chemical bonds between the metal and the oxygen atoms. Exemplary metals in preferred embodiments may include aluminum, silicon, tin, zirconium, titanium, silver, or zinc. The nanometal may be provided in a dispersion state, e.g., as being dispersed in a resin (e.g., a resin curable by ultraviolet light, or ultraviolet resin).

The anti-fingerprint film may further include a hard coating layer located under the base layer, a transparent film layer located under the hard coating layer, a printing layer located under the transparent film layer, a binder layer located under the printing layer, and a film layer located under the binder layer.

The fluorine-based compound may suitably include perfluoropolyether (PFPE).

The base layer may include an amount of about 15 to 25 wt % of a silane-based coupling agent and an amount of about 75 to 85 wt % of activated carbon, based on the total weight of the lase layer, and the outermost layer may suitably include an amount of about 0.1 to 1 wt % of the fluorine-based compound, an amount of about 1 to 10 wt % of nonafluorobutyl ether, an amount of about 20 to 30 parts by weight of iron, an amount of about 60 to 70 wt % of stainless steel, and an amount of about 1 to 3.5 wt % of an additive, based on the total weight of the outermost layer.

In an aspect, provided is method of producing an anti-fingerprint film including preparing an anti-fingerprint coating solution including a fluorine-based compound, forming an outermost layer by applying the anti-fingerprint coating solution on a base layer, and subjecting the outermost layer to drying and then UV curing.

The method may further include stacking a binder layer, a printing layer, and the base layer on a film layer, before preparing the anti-fingerprint coating solution.

The fluorine-based compound may suitably include one or more selected from the group consisting of 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, α-trifluoromethyl methacrylate, and α-trifluoroethyl methacrylate.

The anti-fingerprint coating solution may suitably include an amount of about 12 to 30 wt % of a urethane acrylate oligomer, an amount of about 7 to 50 wt % of an acrylate monomer, an amount of about 0.05 to 2 wt % of the fluorine-based compound, an amount of about 0.02 to 0.3 wt % of a silicone resin, an amount of about 0.06 to 2 wt % of a nanometal oxide, an amount of about 0.5 to 10 wt % of a photoinitiator, an amount of about 0.1 to 1 wt % of a stabilizer, and an amount of about 30 to 70 wt % of a solvent component, based on the total weight of the anti-fingerprint coating solution.

The drying may be performed at a temperature of about 40 to 120° C. for about 1 to 10 minutes, and the UV curing may be performed in a nitrogen ($N_2$) atmosphere having an oxygen concentration of about 3,000 ppm or less.

In another aspect, provided is a method of producing an anti-fingerprint film including preparing a primer coating solution and an anti-fingerprint coating solution including a fluorine-based compound, primarily depositing a base layer through plasma treatment with the primer coating solution on a hard coating layer, and secondarily depositing an outermost layer through plasma treatment with the anti-fingerprint coating solution on the base layer.

The method may further include stacking a binder layer, a printing layer, a transparent film layer, and the hard coating layer on a film layer, before preparing the anti-fingerprint coating solution.

The primer coating solution may suitably include an amount of about 15 to 25 parts by weight of a silane-based coupling agent and an amount of about 75 to 85 parts by weight of activated carbon, based on the total weight of the primer coating solution, and the anti-fingerprint coating solution may suitably include an amount of about 0.1 to 1 part by weight of the fluorine-based compound, an amount of about 1 to 10 parts by weight of nonafluorobutyl ether, an amount of about 20 to 30 parts by weight of iron, an amount of about 60 to 70 parts by weight of stainless steel, and an amount of about 1 to 3.5 parts by weight of an additive, based on the total weight of the anti-fingerprint coating solution.

The primarily depositing and the secondarily depositing may be performed under conditions of a vacuum pressure of about 5.0 to 10.0 $E^{-5}$ torr, a power of about 8 to 10 kW, a speed of about 12±7 RPM, and a deposition temperature of about 70 to 90° C., and ion plasma may be applied in an argon gas atmosphere.

The primarily depositing and the secondarily depositing may be performed by injecting the primer coating solution and the anti-fingerprint coating solution at a flow rate of about 10 to sccm for about 200 to 400 seconds, the base layer may be deposited to a thickness of about 150±50 Å, and the outermost layer may be deposited to a thickness of about 250±50 Å.

Also provided is a vehicle part (e.g., interior parts of a vehicle) including the anti-fingerprint film as described herein.

Further provided is a vehicle including the vehicle part as described herein.

BRIEF DESCRIPTION OF THE DRAWINGS

The above and other features of the present disclosure will now be described in detail with reference to certain exemplary embodiments thereof illustrated in the accompanying drawings, which are given hereinbelow by way of illustration only, and thus are not limitative of the present disclosure, and wherein.

DETAILED DESCRIPTION

The above and other objects, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18°/O, 20% to 30%, etc., as well as all integers including values of 10%, 11%, 12%, 13% and the like up to 30%, and will also be understood to include any value between valid integers within the stated range, such as 10.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
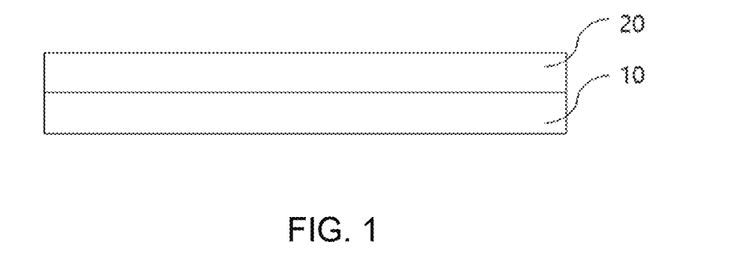
FIG. 1 shows a cross-sectional view of an exemplary anti-fingerprint film according to an embodiment of the present disclosure.

Provided herein, among other things, are an anti-fingerprint film for automobile interior parts including a fluorine-based compound and a method of producing the same. As shown in FIG. 1, the anti-fingerprint film may include a base layer 10 and an outermost layer 20 located on the base layer 10 and including a fluorine-based compound. FIG. 1 shows a cross-sectional view schematically showing an exemplary anti-fingerprint film according to an exemplary embodiment of the present disclosure.

Hereinafter, embodiments of the present disclosure will be described in more detail with reference to the accompanying drawings.

Figure 2:
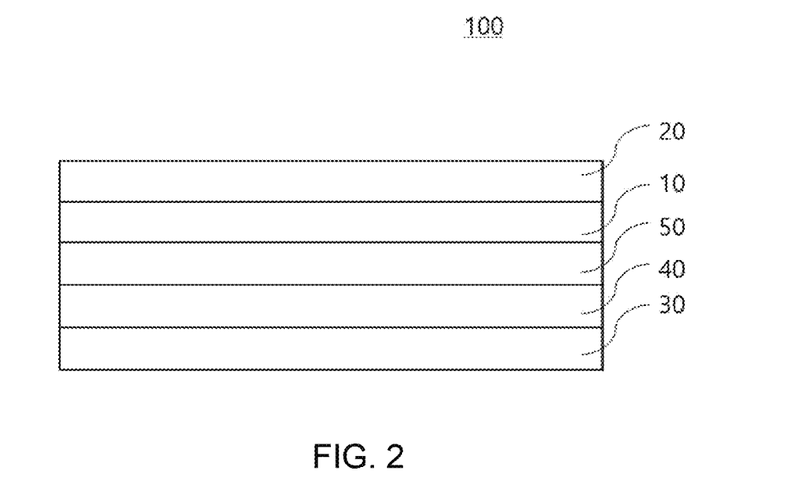
FIG. 2 shows a cross-sectional view schematically showing an anti-fingerprint film according to a first embodiment of the present disclosure.

The anti-fingerprint film according to an exemplary embodiment is shows in FIG. 2. FIG. 2 shows a cross-sectional view schematically showing the anti-fingerprint film.

The anti-fingerprint film 100 may include a film layer 30, a binder layer 40, a printing layer 50, a base layer 10, and an outermost layer 20. The anti-fingerprint film 100 may be configured such that the film layer 30, the binder layer 40, the printing layer 50, the base layer 10, and the outermost layer 20 are sequentially stacked.

(A-1) Film Layer

The film layer 30 may be a layer for stacking the printing layer 50 and may be located at the lowermost position. The film layer 30 may include an olefin resin such as polyethylene (PE), polypropylene (PP), or polyethylene terephthalate (PET), or polyvinyl chloride (PVC), but the present disclosure is not limited thereto. The film layer 30 may include a transparent, translucent, or opaque film.

Preferably, when the present disclosure is applied to an automobile part, the film layer 30 may be applied using an injection molding material (PC, ABS, etc.).

(A-2) Binder Layer

The binder layer 40 may be a layer for bonding the film layer 30 and the printing layer 50, and may be located on the film layer 30. The binder layer 40 may include a transparent epoxy material having predetermined adhesion.

(A-3) Printing Layer

The printing layer 50 may be a layer in which the overall color sensation is realized in the anti-fingerprint film 100 and the base layer 10 is stacked thereon, and may be located on the binder layer 40.

The printing layer 50 may be printed with ink selected from the group consisting of urethane-based ink, polyvinyl-chloride-based ink, and combinations thereof, but the present disclosure is not limited thereto.

(A-4) Base Layer

The base layer 10 may be a layer that is coated with the outermost layer 20, and may be located between the printing layer 50 and the outermost layer 20.

For example, the base layer 10 may include a transparent material with a thickness of about 0.1 to 1 mm, but the present disclosure is not limited thereto.

The base layer 10 may include one or more selected from a polycarbonate (PC) film, a poly(methyl methacrylate) (PMMA) film, a polycarbonate/poly(methyl methacrylate) coextrusion film, and a polyethylene terephthalate (PET)-based film.

(A-5) Outermost Layer

The outermost layer 20 may be located on the base layer 10 and includes a fluorine-based compound.

The outermost layer 20 is located at the outermost position of the anti-fingerprint film 100, and may have physical performance such as hardness and wear resistance, and chemical resistance such as cold resistance, salt water resistance, and solvent resistance, while reducing fingerprint visibility by reducing the attachment area of the fingerprint composed of water and oil because the fluorine-based compound having high water and oil repellency is applied.

The outermost layer 20 may include a component of a conventional hard coating layer that confers impact resistance, scratch resistance, high hardness, and the like.

The outermost layer 20 may be formed through a wet process in a roll-to-roll manner such as microgravure, slot die, or the like.

The outermost layer 20 may include an amount of about 15 to 45 wt % of a urethane acrylate oligomer, an amount of about 10 to 70 wt % of an acrylate monomer, an amount of about 0.07 to 3 wt % of the fluorine-based compound, an amount of about 0.03 to 0.4 wt % of a silicone resin, and an amount of about 0.08 to 3 wt % of a nanometal oxide, an amount of about 0.7 to 15 wt % of a photoinitiator, and an amount of about 0.15 to 1.5 wt % of a stabilizer, based on the total weight of the outermost layer.

The urethane acrylate oligomer includes an ultraviolet curable resin that imparts hardness to the coating film, and has about 30 to 80 functional groups, a viscosity of about 800 to 2,000, and a weight average molecular weight (Mw) of about 5,000 to 9,000 g/mol.

The urethane acrylate oligomer may be included in an amount of about 15 to 45 wt % in the outermost layer 20, based on the total weight of the outermost layer. When the amount of the urethane acrylate oligomer is less than about 15 wt %, hardness may be excellent, but bendability may be insufficient. On the other hand, when the amount of the urethane acrylate oligomer is greater than about 45 wt %, bendability may be excellent, but hardness may be insufficient.

The acrylate monomer may be included in an amount of about 10 to 70 wt % in the outermost layer 20.

The acrylate monomer may include a first acrylate monomer, a second acrylate monomer, and a third acrylate monomer.

The first acrylate monomer is used to impart high hardness to the coating film, and may have about 6 to 30 functional groups and a weight average molecular weight (Mw) of about 1,800 to 5,500 g/mol.

The first acrylate monomer may be included in an amount of about 5 to 34 wt % in the outermost layer 20, based on the total weight of the outermost layer. When the amount of the first acrylate monomer is less than about 5 wt %, bendability may be excellent, but hardness may be insufficient. On the other hand, when the amount of the first acrylate monomer is greater than about 34 wt %, hardness may be excellent, but bendability may be insufficient.

The second acrylate monomer is used to balance hard and soft properties of the coating film, and may have 4 to 20 functional groups.

The second acrylate monomer may be included in an amount of 4 to 28 wt % in the outermost layer 20, based on the total weight of the outermost layer. When the amount of the second acrylate monomer is less than about 4 wt %, bendability may be excellent, but hardness may be insufficient. On the other hand, when the amount of the second acrylate monomer is greater than about 28 wt %, hardness and scratch resistance may be excellent, but bendability may be insufficient.

The second acrylate monomer may include one or more selected from the group consisting of pentaerythritol tetraacrylate, ditrimethylolpropane tetraacrylate, dipentaerythritol pentaacrylate, and dipentaerythritol hexaacrylate.

The third acrylate monomer may improve coatability by controlling viscosity, and may have 2 to 3 functional groups, and a weight average molecular weight (Mw) of about 296 to 956 g/mol.

The third acrylate monomer may be included in an amount of about 0.8 to 10 wt % in the outermost layer 20, based on the total weight of the outermost layer. When the amount of the third acrylate monomer is less than about 0.8 wt %, hardness may be excellent, but coatability may be insufficient due to high viscosity. On the other hand, when the amount of the third acrylate monomer is greater than about 10 wt %, coatability may be improved because of low viscosity, but hardness may be insufficient.

The third acrylate monomer may include one or more selected from the group consisting of polyethylene glycol diacrylate, bisphenol diacrylate, polypropylene glycol diacrylate, tris(2-hydroxyethyl)isocyanurate diacrylate, trimethylolpropane triacrylate, glycerine triacrylate, pentaerythritol triacrylate, and tris(2-hydroxyethyl)isocyanurate triacrylate.

The fluorine-based compound includes a fluorine atom in a molecule thereof and is photocurable due to the presence of an acryl therein, and may provide realize water repellency and oil repellency.

The fluorine-based compound may be an ultraviolet (UV) curable resin. The fluorine-based compound may include a copolymer of perfluoropolyether (PFPE) and (meth)acrylate, which can be obtained by coupling perfluoropolyether (PFPE) with (meth)acrylate.

The fluorine-based compound may suitably include at least one selected from the group consisting of 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, α-trifluoromethyl methacrylate, α-trifluoroethyl methacrylate, and combinations thereof.

The fluorine-based compound may be included in an amount of about 0.07 to 3 wt % in the outermost layer 20, based on the total weight of the outermost layer. When the amount of the fluorine-based compound is less than about 0.07 wt %, anti-fingerprint performance may be insufficient. On the other hand, when the amount of the fluorine-based compound is greater than about 3 wt %, antifouling properties may be excellent, but transmittance and haze may increase, which is undesirable.

The silicone resin may improve anti-fingerprint properties in addition to imparting coatability and coating uniformity, and is used for the purpose of further improving anti-fingerprint properties when a fluororesin is used in combination therewith rather than when used alone. The silicone resin may be included in an amount of about 0.03 to 0.4 wt % in the outermost layer 20. Particularly, the silicone resin may include polyester-modified acrylic functional polydimethylsiloxane.

The nanometal oxide may be used to ensure wear resistance of the outermost layer 20, and may be included in an amount of about 0.08 to 3 wt % in the outermost layer 20, based on the total weight of the outermost layer. If When amount of the nanometal oxide is less than about 0.08 wt %, scratch resistance may be insufficient. On the other hand, when the amount of the nanometal oxide is greater than about 3 wt %, antifouling properties may be excellent, but transmittance and haze may increase, which is undesirable.

Particularly, the nanometal oxide may be obtained by dispersing metal oxide nanoparticles including aluminum, silicon, tin, zirconium, titanium, silver, or zinc in an ultraviolet resin. The nanometal oxide may be configured such that a metal oxide having a diameter (D50) of about 5 to 100 nm is dispersed with a solid content of about 40 to 60 wt % in an ultraviolet resin based on the total weight of the nanometal oxide. The ultraviolet resin may be a monofunctional monomer having 2 to 3 functional groups. Particularly, the ultraviolet resin may be a monofunctional (meth) acrylate monomer.

The photoinitiator may be included in an amount of about 0.7 to 15 wt % in the outermost layer 20, based on the total weight of the outermost layer. When the amount of the photoinitiator is less than about 0.7 wt %, hardness and wear resistance may be lowered due to insufficient curing. On the other hand, when the amount of the photoinitiator is greater than about 15 wt %, cracking may occur during IML forming owing to brittleness of the coating film due to excessive curing.

Exemplary photoinitiator may include isopropyl benzoin ether, isobutyl benzoin ether, benzophenone, Michler's ketone, o-benzoylmethyl benzoate, acetophenone, 2,4-diethylthioxanthone, 2-chlorothioxanthone, ethyl anthraquinone, p-dimethylaminobenzoic acid isoamyl ester, p-dimethylaminobenzoic acid ethyl ester, 1-hydroxycyclohexyl phenyl ketone (e.g. Irgacure 184 from BASF), 2-hydroxy-2-methyl-1-phenyl-propan-1-one (e.g. Darocure 1173 from BASF), 2,2-dimethoxy-1,2-diphenylethan-1-one (e.g. Irgacure 651 from BASF), 2-benzyl-2-dimethylamino-1-(4-morpholinophenyl)-butanone-1, bis(2,4,6-trimethylbenzoyl)-phenylphosphine oxide, methylbenzyl formate, and the like.

The light stabilizer may be included in an amount of about 0.15 to 1.5 wt % in the outermost layer 20.

The light stabilizer that is used may be a known antioxidant or a heat stabilizer.

The solvent component may be further included in the outermost layer 20, based on the total weight of the outermost layer. The solvent component may include at least one selected from the group consisting of methyl ethyl ketone, ethyl acetate, cyclohexane, methyl isobutyl ketone, isopropyl alcohol, polypropylene glycol, polypropylene glycol methyl ether acetate, methoxytriglycol, ethoxytriglycol, butoxytriglycol, 1-butoxyethoxy-2-propanol, phenyl glycol ether, and combinations thereof.

Figure 3:
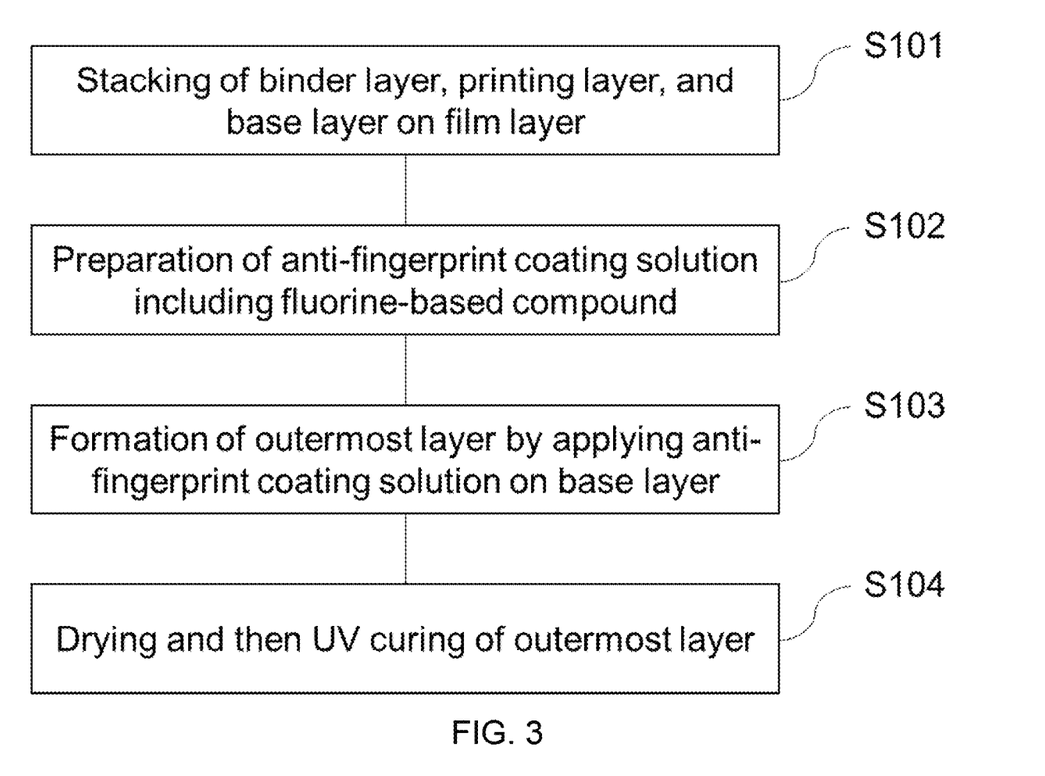
FIG. 3 shows an exemplary method of producing the anti-fingerprint film according to an exemplary embodiment of the present disclosure.

In another aspect, the present disclosure provides a method of producing the anti-fingerprint film 100. FIG. 3 shows an exemplary process of producing the anti-fingerprint firm according to an exemplary embodiment of the present disclosure.

The method of producing the anti-fingerprint film may include preparing an anti-fingerprint coating solution including a fluorine-based compound (S102), forming an outermost layer by applying the anti-fingerprint coating solution on a base layer (S103), and subjecting the outermost layer to drying and then UV curing (S104). The may further include stacking a binder layer, a printing layer, and the base layer on a film layer (S101), before preparing the anti-fingerprint coating solution.

Individual steps of the method of producing the anti-fingerprint film are specified below.

Before description of steps, the configuration of each layer of the anti-fingerprint film according to the first embodiment is as described above and is omitted.

In the step of S101, a binder layer, a printing layer, and a base layer may be sequentially stacked on a film layer.

In the step of S102, an anti-fingerprint coating solution including a fluorine-based compound may be prepared. The fluorine-based compound may include at least one selected from the group consisting of 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, α-trifluoromethyl methacrylate, α-trifluoroethyl methacrylate, and combinations thereof. The anti-fingerprint coating solution may suitably include an amount of about 12 to 30 wt % of a urethane acrylate oligomer, an amount of about 7 to 50 wt % of an acrylate monomer, an amount of about 0.05 to 2 wt % of the fluorine-based compound, an amount of about 0.02 to 0.3 wt % of a silicone resin, an amount of about 0.06 to 2 wt % of a nanometal oxide, an amount of about 0.5 to 10 wt % of a photoinitiator, an amount of about 0.1 to 1 wt % of a stabilizer, and an amount of about 30 to 70 wt % of a solvent component, based on the total weight of the anti-fingerprint coating solution.

In the step of S103, an outermost layer is formed by applying the anti-fingerprint coating solution on the base layer. Any coating methods of applying the coating solution may be performed through a wet process in a roll-to-roll manner. In the roll-to-roll manner, a coating process such as microgravure, slot die, etc. may be applied.

Preferably, in the method of producing the anti-fingerprint film, coating the outermost layer including the fluorine-based compound may be performed through a wet process.

In the step of S104, the outermost layer may be heat-treated, e.g., dried, and then irradiated with ultraviolet rays and thus cured. As such, the drying may be performed at a temperature of about 40 to 100° C. for about 1 to 10 minutes.

The UV curing may be performed in a dose of about 100 to 1500 mJ using a light source such as a mercury or halogen lamp.

In S104, UV curing may be performed in a nitrogen ($N_2$) atmosphere having an oxygen concentration of about 3,000 ppm or less. The nitrogen atmosphere of about 3,000 ppm or less blocks oxygen during reaction to thus prevent an unintended reaction such as an oxidation reaction during curing of the outermost layer, thereby increasing purity. On the other hand, when UV curing is performed in a nitrogen ($N_2$) atmosphere having an oxygen concentration of about 3,000 ppm, purity is not good, and the water contact angle and the oil contact angle are decreased, thus deteriorating anti-fingerprint properties, which is undesirable.

Subsequently, after S104, attaching a protective film to the outermost layer may be additionally performed in order to protect the outermost layer. Here, the protective film may include a PP (polypropylene)-, PE (polyethylene)-, or PET-based adhesive protective film having a thickness of 25 to 200 μm.

Figure 4:
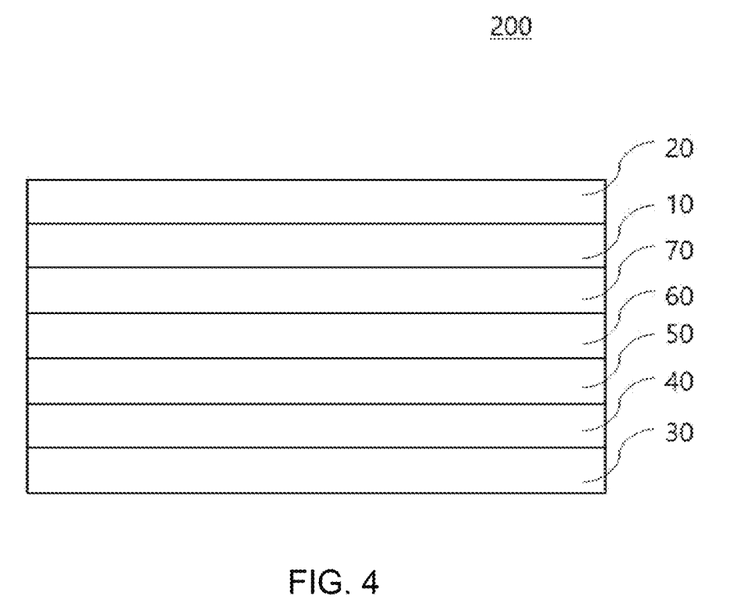
FIG. 4 shows a cross-sectional view schematically showing an anti-fingerprint film according to an exemplary embodiment of the present disclosure.

Alternatively, an anti-fingerprint film may have a structure as shown in FIG. 4. FIG. 4 shows a cross-sectional view of an exemplary anti-fingerprint film according to another exemplary embodiment of the present disclosure.

The anti-fingerprint film 200 may include a film layer 30, a binder layer 40, a printing layer 50, a transparent film layer 60, a hard coating layer 70, a base layer 10, and an outermost layer 20.

The anti-fingerprint film 200 may be configured such that the film layer 30, the binder layer 40, the printing layer 50, the transparent film layer 60, the hard coating layer 70, the base layer 10, and the outermost layer 20 are sequentially stacked.

The base layer 10 and the outermost layer 20 are provided in a different form in the second embodiment, and the film layer 30, the binder layer 40, and the printing layer 50 are as described in the first embodiment, and a description thereof is omitted.

(B-1) Transparent Film Layer

The transparent film layer 60 may be a layer that is coated with the hard coating layer 70, and may be located between the printing layer 50 and the hard coating layer 70.

The transparent film layer 60 may include a transparent material, which may be the same material as the base layer used in the anti-fingerprint film according to the first embodiment. For example, the transparent film layer 60 may include at least one selected from among a polycarbonate (PC) film, a poly(methyl methacrylate) (PMMA) film, a polycarbonate/poly(methyl methacrylate) coextrusion film, and a polyethylene terephthalate (PET)-based film.

(B-2) Hard Coating Layer

The hard coating layer 70 is located on the transparent film layer 60 and is a layer that confers impact resistance, scratch resistance, high hardness, and antifouling properties.

The hard coating layer is the same as the configuration of the outermost layer excluding the fluorine-based compound used in the anti-fingerprint film according to the first embodiment, and a conventionally known material for the hard coating layer may be used.

(B-3) Base Layer

The base layer 10 is a layer that is coated with the outermost layer 20, and may be located between the hard coating layer 70 and the outermost layer 20.

The base layer 10 may also serve as a primer that enables the hard coating layer 70 and the outermost layer 20 to be efficiently applied as shown in FIG. 4.

The base layer 10 may have adhesiveness and may serve to improve the durability of the anti-fingerprint film 200.

The base layer 10 may include an amount of about 15 to 25 wt % of a silane-based coupling agent and an amount of about 75 to 85 wt % of activated carbon based on the total weight of the base layer.

The silane-based coupling agent may suitably include an organic-inorganic binding compound. The silane-based coupling agent may preferably include triethoxy[3-(oxiranylmethoxy)propyl]silane.

The activated carbon may serve as a dispersant. The activated carbon may suitably include pitch-based carbon.

(B-4) Outermost Layer

The outermost layer 20 is located on the base layer 10 and includes a fluorine-based compound.

The outermost layer 20 includes the fluorine-based compound having high water and oil repellency to thus reduce the attachment area of the fingerprint composed of water and oil, thereby lowering fingerprint visibility.

The outermost layer 20 may be also formed through an ion plasma process, which is a dry process.

The outermost layer 20 may include an amount of about 0.1 to 1 wt % of the fluorine-based compound, an amount of about 1 to 10 wt % of nonafluorobutyl ether, an amount of about 20 to 30 parts by weight of iron, an amount of about 60 to 70 wt % of stainless steel, and an amount of about 1 to 3.5 wt % of an additive, based on the total weight of the outermost layer.

The fluorine-based compound may include a fluorine atom in a molecule thereof, and may particularly include perfluoropolyether (PFPE).

The nonafluorobutyl ether may be used as a solvent component. The stainless steel that is used may be an iron crucible. As the additive, a known heat stabilizer, UV stabilizer, etc. may be used.

Figure 5:
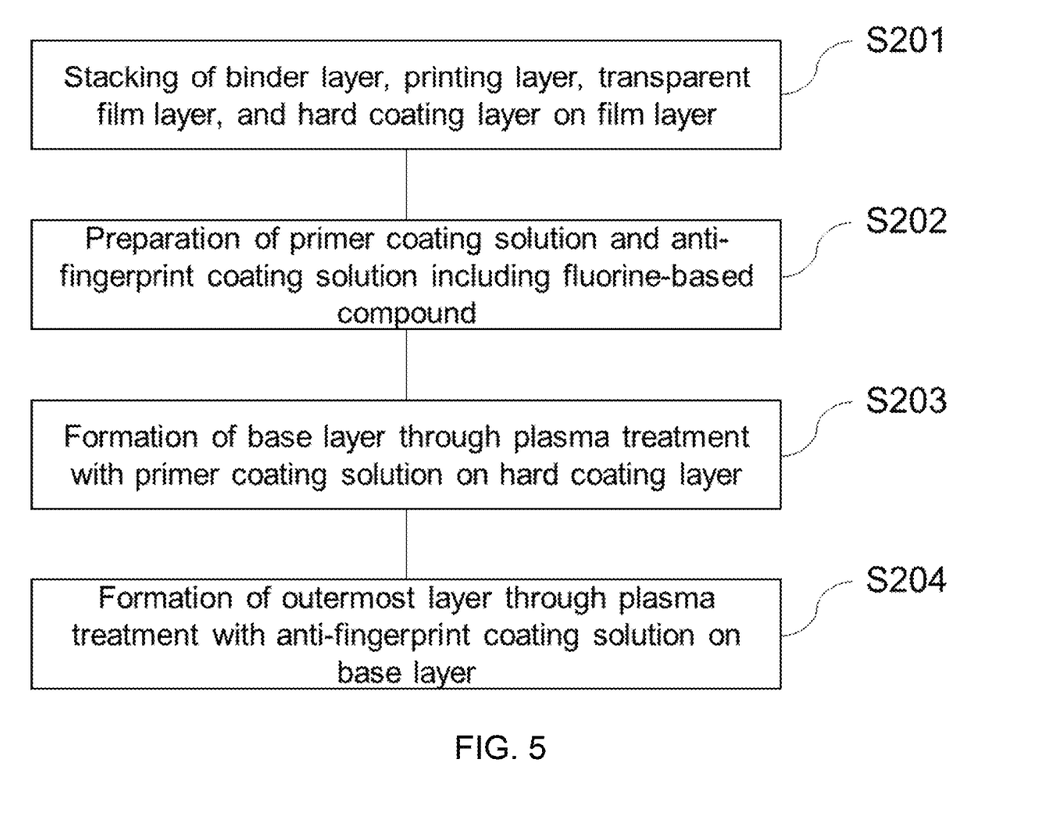
FIG. 5 shows an exemplary method of producing the anti-fingerprint film according to an exemplary embodiment of the present disclosure.

In another aspect, the present disclosure provides a method of producing the anti-fingerprint film 200. FIG. 5 shows an exemplary process of producing the anti-fingerprint film according to an exemplary embodiment of the present disclosure.

The method of producing the anti-fingerprint film may include preparing a primer coating solution and an anti-fingerprint coating solution including a fluorine-based compound (S202), primarily depositing a base layer through plasma treatment with the primer coating solution on a hard coating layer (S203), and secondarily depositing an outermost layer through plasma treatment with the anti-fingerprint coating solution on the base layer (S204). The method of producing the anti-fingerprint film may further include stacking a binder layer, a printing layer, a transparent film layer, and the hard coating layer on a film layer (S201), before preparing the anti-fingerprint coating solution.

Individual steps of the method of producing the anti-fingerprint film according to the second embodiment of the present disclosure are specified below.

Before description of steps, the configuration of each layer of the anti-fingerprint film according to the second embodiment is as described above and is omitted.

In the step of S201, a binder layer, a printing layer, a transparent film layer, and a hard coating layer are stacked on a film layer. After stacking up to the hard coating layer, a part that may be subjected to film forming, trimming, and back injection may be used.

In the step of S202, a primer coating solution and an anti-fingerprint coating solution including a fluorine-based compound are prepared. The fluorine-based compound may suitably include a compound containing a fluorine atom in a molecule thereof, and may specifically be perfluoropolyether (PFPE).

The primer coating solution may include, e.g. by mixing, an amount of about 15 to 25 parts by weight of a silane-based coupling agent and an amount of about 75 to 85 parts by weight of activated carbon, and the anti-fingerprint coating solution may include, e.g., by mixing, an amount of about 0.1 to 1 part by weight of the fluorine-based compound, an amount of about 1 to parts by weight of non-afluorobutyl ether, an amount of about 20 to 30 parts by weight of iron, an amount of about 60 to 70 parts by weight of stainless steel, and an amount of about 1 to 3.5 parts by weight of an additive, based on the total weight of the anti-fingerprint coating solution.

In the step of S203, a base layer may be formed through plasma treatment with the primer coating solution on the hard coating layer. The primer coating solution may be deposited using ion beam plasma in a vacuum atmosphere.

For example, the part subjected to injection molding may be mounted to a jig in a chamber, and foreign substances and dust are removed from the surface of the part through static elimination. Then, the inside of the chamber may be evacuated, after which ion beam plasma may be applied to the primer coating solution to thus deposit a base layer.

The process may be performed under conditions of a vacuum pressure of about 5.0 to 10.0 $E^{-5}$ torr, a power of about 8 to 10 kW, a speed of about 12±7 RPM, and a deposition temperature of about 70 to 90° C., and ion plasma may be applied in an argon gas atmosphere.

Preferably, the primer coating solution (CK-RA-05) may be injected at a flow rate of about 10 to 20 sccm for about 120±20 seconds, and during coating, E-beam power may be about 10±5 mA and E-beam size (scan value) may be about 80.

The base layer may preferably be deposited to a thickness of about 150±50 Å.

In the step of S204, an outermost layer may be formed through plasma treatment with the anti-fingerprint coating solution on the base layer.

Accordingly, in the method of producing the anti-fingerprint film according to this exemplary embodiment, the outermost layer including the fluorine-based compound may be formed through a dry process in a deposition manner using plasma.

Particularly, in the step of S204, the anti-fingerprint coating solution may be deposited using ion beam plasma in a vacuum atmosphere. For example, ion beam plasma may be applied to the anti-fingerprint coating solution to thus deposit the outermost layer. The process may be performed under conditions of a vacuum pressure of about 5.0 to 10.0 $E^{-5}$ torr, a power of about 8 to 10 kW, a speed of about 12±7 RPM, and a deposition temperature of about 70 to 90° C., and ion plasma may be applied in an argon gas atmosphere.

The specific deposition conditions in S204 are as follows. The anti-fingerprint coating solution (DON 9100_(6G)) may be injected at a flow rate of about 10 to 20 sccm for about 180±50 seconds, and during coating, E-beam power may be about 95±5 mA and E-beam size (scan value) may be 0.

In the step of S204, the outermost layer may be deposited to a thickness of about 250=50 Å. When deposition of the outermost layer to a predetermined thickness is completed, the vacuum state is released, and the part is detached to thus complete the coating process.

EXAMPLE

A better understanding of the present disclosure may be obtained through the following examples. These examples are merely set forth to illustrate the present disclosure, and are not to be construed as limiting the scope of the present disclosure.

Test Example 1 (Wet Process)

Respective anti-fingerprint coating solutions were prepared using components in the amounts as shown in Table 1 below. Then, using a conventional method of producing an IML film, an anti-fingerprint film in which a film layer, a binder layer, a printing layer, a base layer, and an outermost layer were sequentially stacked was manufactured. As such, the outermost layer was formed through a wet coating process on the base layer using the anti-fingerprint coating solution. The hard coating solution was cured under curing conditions shown in Table 1, finally producing an anti-fingerprint film. The base layer was a transparent film having a thickness of to 1 mm formed using any one selected from among PC, PMMA, a PC/PMMA coextrusion film, and a PET-based film.

TABLE 1

| Component (wt %) | | Example 1 | Example 2 | Comp. Example 1 | Comp. Example 2 | Comp. Example 3 | Comp. Example 4 | Comp. Example 5 |
|---|---|---|---|---|---|---|---|---|
| Urethane acrylate oligomer (Resin 1) | | 22.9 | 30 | 11 | 31.4 | 23.2 | 23.1 | 22.9 |
| Acrylate monomer | 1st Acrylate monomer (Resin 2) | 7.7 | 3.8 | 14.6 | 4.5 | 7.8 | 7.7 | 7.7 |
| | 2nd Acrylate monomer (Resin 3) | 3.8 | 3.8 | 8.2 | 3.6 | 3.9 | 3.9 | 3.8 |
| | 3rd Acrylate monomer (Resin 4) | 2.9 | 0.9 | 6.4 | 1.8 | 2.9 | 2.9 | 2.9 |
| Fluorine-based compound | | 1.4 | 1.4 | 1.4 | 1.3 | 0.1 | 1.4 | 1.4 |
| Solvent | PGME | 28.7 | 28.2 | 27.4 | 26.9 | 29.1 | 29.0 | 28.7 |
| | MIBK | 28.7 | 28.2 | 27.4 | 26.9 | 29.1 | 29.0 | 28.7 |
| Nanometal oxide | | 1.0 | 0.9 | 0.9 | 0.9 | 1.0 | 0.1 | 1.0 |
| Photoinitiator | | 2.9 | 2.8 | 2.7 | 2.7 | 2.9 | 2.9 | 2.9 |
| Curing conditions | | $N_2$ atmosphere UV curing | $N_2$ atmosphere UV curing | $N_2$ atmosphere UV curing | $N_2$ atmosphere UV curing | $N_2$ atmosphere UV curing | $N_2$ atmosphere UV curing | General (oxygen exposure) UV curing |

[Components]
1. Multifunctional urethane acrylate oligomer: functional groups = 30-80, Viscosity of 800-1100, MW of 5000-7500, D2 UV resin product from Miwon
2. Acrylate monomer
1st Acrylate monomer: MW = 1800-5500, functional groups = 6-30, PU610 UV resin from Miwon
2nd Acrylate monomer: functional groups = 4-20, Pentaerythritol tetraacrylate, Ditrimethylolpropane tetraacrylate, Dipentaerythritol pentaacrylate, etc., M600 UV from Miwon
3rd Acrylate monomer: MW = 296-956, functional groups = 2-3, Polyethylene glycol diacrylate, Bisphenol diacrylate, etc., M206 UV resin from Miwon
3. Fluorine-based compound: X-71-1203M from Shin-Etsu, Japan, using fluorine-based UV resin (25% of fluororesin solids)
4. Solvent: Use of a mixed solvent of PGME and MIBK at 1:1
5. Nanometal oxide: Use of NANOBYK 3601 (30% of nano$Al_2O_3$ solids) from BYK
7. Photoinitiator: Use of I-184 UV curing initiator from Ciba Specialty Chemicals Then, the properties of the anti-fingerprint film were evaluated through the following performance evaluation method, and the results thereof are shown in Table 2 below.

Performance Evaluation Method
(1) Pencil hardness: Pencil hardness was evaluated using a pencil hardness tester at a speed of 100 mm/min under 750 g.
(2) Scratch resistance: Scratch resistance was evaluated using a sapphire tip under 500 g.
(3) Heat bendability: Using a heat forming machine for a mass-produced part (JK steering wheel switch), whether the outermost layer was cracked or not was evaluated during molding under the same conditions as in mass production.
(4) Water contact angle: The contact angle of water (distilled water) was measured using an automatic contact angle meter.
(5) Oil contact angle: The contact angle of DIM (diiodomethane) was measured using an automatic contact angle meter.
(6) Surface energy: The surface energy before and after light fastness was measured.

TABLE 2

| Evaluation items | Example 1 | Example 2 | Comp. Example 1 | Comp. Example 2 | Comp. Example 3 | Comp. Example 4 | Comp. Example 5 |
|---|---|---|---|---|---|---|---|
| (1) Hardness | 2H | 1H | 2H | 1H> | 1H | 1H> | 2H |
| (2) Scratch resistance | OK | OK | OK | NG | OK | NG | OK |
| (3) Heat bendability | OK | OK | Cracking | OK | OK | OK | OK |
| (4) Water contact angle | 115 | 114 | 115 | 114 | 106 | 114 | 108 |
| (5) Diiodomethane contact angle | 94 | 94 | 94 | 94 | 82 | 94 | 84 |
| (6) Surface energy (dyne/cm) | 10.8 | 10.7 | 10.8 | 10.7 | 16 | 10.7 | 15.1 |

As shown in Table 2, Examples 1 and 2 using the anti-fingerprint coating solution including a fluorine-based compound and individual components mixed in appropriate amounts showed excellent results in hardness, scratch resistance, heat bendability, water contact angle, oil contact angle, and surface energy properties.

In contrast, Comparative Example 1, in which the amount of the urethane acrylate oligomer in the anti-fingerprint coating solution was less than 12 wt %, showed a problem in that cracking occurred in the heat bending evaluation.

Also, Comparative Example 2, in which the amount of the urethane acrylate oligomer in the anti-fingerprint coating solution was greater than 30 wt %, showed very poor scratch resistance.

Also, Comparative Example 3, in which the amount of the fluorine-based compound in the anti-fingerprint coating solution was less than 0.2 wt % (fluororesin of 0.05 wt %), showed poor water contact angle, oil contact angle, and surface energy properties compared to Examples.

Also, Comparative Example 4, in which the amount of the nanometal oxide in the anti-fingerprint coating solution was less than 0.2 wt % (solid content of 0.06 wt %), showed very poor scratch resistance.

Also, Comparative Example 5, in which the anti-fingerprint coating solution was UV-cured through exposure to oxygen, not in a nitrogen atmosphere, showed poor water contact angle, oil contact angle, and surface energy properties compared to Examples.

In particular, the surface energy of the anti-fingerprint film according to exemplary embodiments of the present disclosure was measured to be about 10 dyne/cm.

Figure 6A:
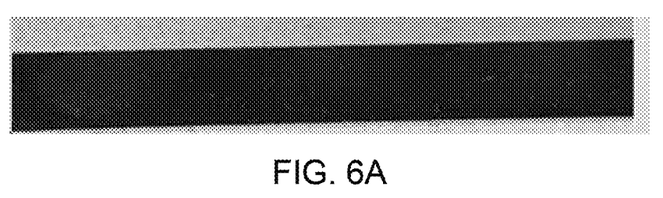
FIG. 6A shows an exemplary anti-fingerprint film according to an exemplary embodiment of the present disclosure.

As shown in FIG. 6A, the film having surface energy of 10 dyne/cm exhibited superior anti-fingerprint properties, as visually observed. Here, FIG. 6A shows the anti-fingerprint film according to the first embodiment of the present disclosure.

Figure 6B:
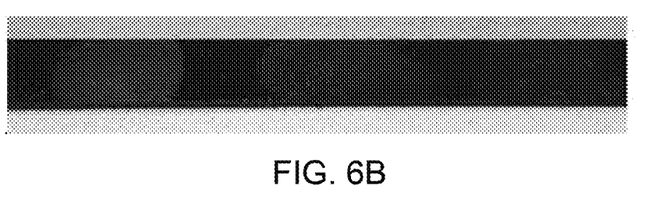
FIG. 6B shows an anti-fingerprint film according to a comparative example.

However, as shown in FIG. 6B, the film having surface energy of 16 dyne/cm did not exhibit superior anti-fingerprint properties, as visually observed. Here, FIG. 6B shows the anti-fingerprint film according to Comparative Example 3.

Thus, the anti-fingerprint film according to an exemplary embodiment of the present disclosure was capable of lowering fingerprint visibility by reducing a fingerprint attachment area due to high water- and oil-repellent coating through a wet deposition process.

Also, the anti-fingerprint film according to the exemplary embodiment of the present disclosure may be subjected to trimming and an injection molding process using plastic injection molding materials (ABS, PC, PC+ABS, etc.) so that a part having the protective film attached thereto is subjected to heat and vacuum forming treatment, the protective film is removed therefrom, and the part is seated in an injection mold.

Therefore, the anti-fingerprint film according to various exemplary embodiments of the present disclosure is molded in the same manner as film molding for automobile interior parts, making it possible to ensure an elongation capable of heat forming and to realize continuous production in a roll-to-roll coating manner, resulting in reduced costs.

Test Example 2 (Dry Process)

In addition, an anti-fingerprint film was manufactured by sequentially stacking a film layer, a binder layer, a printing layer, a transparent film layer, a hard coating layer, a transparent film layer, a base layer, and an outermost layer under ion plasma conditions as shown in Table 3 below.

As such, the coating process was performed through a dry process of depositing a base layer through plasma treatment with the primer coating solution on the hard coating layer and then depositing an outermost layer through plasma treatment with the anti-fingerprint coating solution on the base layer. The primer coating solution was obtained by mixing 15 to 25 parts by weight of a silane-based coupling agent and 75 to 85 parts by weight of activated carbon, and the anti-fingerprint coating solution was obtained by mixing 0.1 to 1 part by weight of the fluorine-based compound, 1 to 10 parts by weight of nonafluorobutyl ether, 20 to 30 parts by weight of iron, 60 to 70 parts by weight of stainless steel, and 1 to 3.5 parts by weight of an additive.

TABLE 3

| Deposition condition items | Example 3 | Comp. Example 6 | Comp. Example 7 | Comp. Example 8 |
|---|---|---|---|---|
| Vacuum pressure (torr) | 8.0 E$^{-5}$ torr | 4.0 E$^{-5}$ torr | 4.0 E$^{-5}$ torr | 4.0 E$^{-5}$ torr |
| Power (kW) | 10 KW | 10 KW | 10 kW | 10kW |
| Speed (RPM) | 12 RPM | 12 RPM | 12 RPM | 12 RPM |
| Deposition temp. (° C.) | 80° C. | 20° C. | 80° C. | 80° C. |
| E-beam power (mA) | Primer coating solution: 10 mA Anti-fingerprint coating solution: 95 mA | Primer coating solution: 10 mA Anti-fingerprint coating solution: 95 mA | Primer coating solution: 10 mA Anti-fingerprint coating solution: 95 mA | Primer coating solution: 10 mA Anti-fingerprint coating solution: 95 mA |
| Ion plasma conditions | Gas: Ar (argon) Flow rate: 13 sccm Irradiation time: 300 sec | Gas: Ar (argon) Flow rate: 13 sccm Irradiation time: 300 sec | Gas: Ar (argon) Flow rate: 13 sccm Irradiation time: 300 sec | Gas: Ar (argon) Flow rate: 7 ccm Irradiation time: 150 sec |

Then, the properties of the anti-fingerprint film were evaluated through the following performance evaluation method, and the results thereof are shown in Table 4 below.

Performance Evaluation Method (1) Defect rate: After producing 30 mass-produced parts for JK model steering wheel, the defect rate was calculated.

(2) Surface energy: The surface energy before and after light fastness was measured.

TABLE 4

| Evaluation items | Example 3 | Comp. Example 6 | Comp. Example 7 | Comp. Example 8 |
|---|---|---|---|---|
| Defect rate | 3% | 7% | 22% | 10% |
| Surface energy (initial) | 8.9 | 8.5 | 9 | 8.7 |
| Surface energy (after light fastness) | 21.1 | 23.5 | 20.1 | 26.7 |

As shown in Table 4, in Example 3 to which appropriate deposition conditions were applied, the defect rate was measured to be 3% or less, confirming that the defect rate was very low.

In contrast, Comparative Examples 4 to 8, in which deposition conditions of a vacuum pressure of 5.0 to 10.0 $E^{-5}$ torr, a power of 8 to 10 kW, a speed of 12±7 RPM, and a temperature of 70 to 90° C. and ion plasma conditions of applying the primer coating solution and the anti-fingerprint coating solution at a flow rate of 10 to 20 sccm for 200 to 400 seconds in an argon gas atmosphere were not applied, had relatively high defect rates compared to Examples.

Accordingly, the anti-fingerprint film according to an exemplary embodiment of the present disclosure was capable of lowering fingerprint visibility by reducing a fingerprint attachment area by high water- and oil-repellent coating through a dry deposition process.

Test Example 3 (Evaluation of Anti-Fingerprint Properties)

After evaluating the performance of the anti-fingerprint film through the following evaluation method, the surface energy thereof was measured, and the results thereof are shown in Tables 5 and 6 below. Table 5 shows surface energy measurement values of the anti-fingerprint film according to the first embodiment, and Table 6 shows surface energy measurement values of the anti-fingerprint film according to the second embodiment.

The surface energy was calculated using the Owens-Wendt geometric mean after measuring the water (polar) contact angle and the diiodomethane (non-polar) contact angle.

Performance Evaluation Method (1) Wear resistance: Based on MS200-42, after wrapping a friction element under a load of 4.9(N) with a double-sided canvas #10 (JIS L 3102) at 20 mm×20 mm width, 10,000 tests were performed under conditions of a stroke of 100 mm and a speed of 60 reciprocations/min.

(2) Sunscreen resistance: Based on MS200-42, two white cotton cloth sheets having the same size were stacked on an acrylic plate (50×50 mm), 0.25 g of NIVEA SPF47 sunscreen was applied to the entire surface thereof, and the resulting acrylic plate was placed on a test piece, pressed, allowed to stand in a thermostat at 80±2° C. for 1 hour, allowed to stand at room temperature for about 10 minutes, washed with a neutral detergent, and dried. A tape peel test and a scratch test were performed according to ISO 2409 or JIS 5600-5-6.

(3) Heat resistance: Based on MS200-42, the film part was placed in a chamber at an ambient temperature of 80° C. and allowed to stand for 300 hours.

(4) Heat cycle resistance: Based on MS200-42, the film was allowed to stand a total of 3 cycles under complex environmental conditions (80° C.×3 hours→−40° C.×3 hours→>50° C.×95% (relative humidity)×3 hours).

(5) Moisture resistance: Based on MS 200-42, the film was allowed to stand in a chamber in an atmosphere of 50° C. and 95% (relative humidity) for 168 hours.

(6) Chemical resistance: Based on MS200-42, a chemical was applied in a certain amount onto gauze, and 10 reciprocating motions were performed using a 500 g weight.

(7) Light fastness: Using a tester specified in MS210-05 ISO 105, the film was irradiated in a total dose of 84 mJ/m$^2$ with a Xenon lamp light source.

TABLE 5

| Evaluation items Contact angle | Surface energy |
|---|---|
| Initial contact angle | 10.8 |
| Wear resistance | 11 |
| Sunscreen resistance | 11.5 |
| Heat resistance (80° C.) | 11 |
| Heat cycle resistance | 10.6 |
| Moisture resistance | 10.5 |
| Chemical resistance (ethanol) | 11.4 |
| Light fastness | 12 |

TABLE 6

| Evaluation items Contact angle | Surface energy |
|---|---|
| Initial contact angle | 8.9 |
| Wear resistance | 9.1 |
| Sunscreen resistance | 9.2 |
| Heat resistance (80° C.) | 9.1 |
| Heat cycle resistance | 9 |
| Moisture resistance | 9.2 |
| Chemical resistance (ethanol) | 9.1 |
| Light fastness | 21.1 |

Before analysis of the results, the surface energy of sweat is about 69 dyne/cm, and the surface energy of fatty acid (sebum) is about 30-32 dyne/cm. In order to minimize the application area on the surface of the part, surface energy less than the surface energy values described above has to be provided.

Since the surface energy of a conventional UV curable film was 22-37 dyne/cm, anti-fingerprint properties may be exhibited at a surface energy value lower than the surface energy of the above UV curable film. Specifically, anti-fingerprint properties may be obtained only when the surface energy was measured to be 15 dyne/cm or less.

As shown in Table 5, the wet coating film was confirmed to maintain anti-fingerprint properties after durability evaluation.

Further, as shown in Table 6, the dry deposition coating product was confirmed to maintain anti-fingerprint properties after durability evaluation except for light fastness.

Figure 7A:
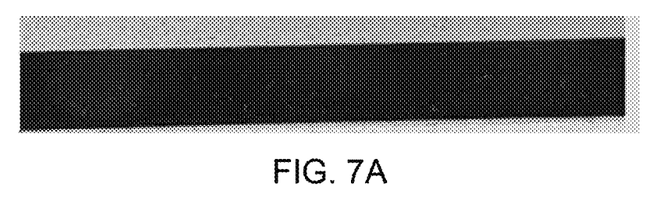
FIG. 7A shows an exemplary anti-fingerprint film according to an exemplary embodiment of the present disclosure.

As shown in FIG. 7A, the film having surface energy of 10 dyne/cm exhibited superior anti-fingerprint properties, as visually observed. Here, FIG. 7A shows an exemplary anti-fingerprint film according to an exemplary embodiment of the present disclosure.

Figure 7B:
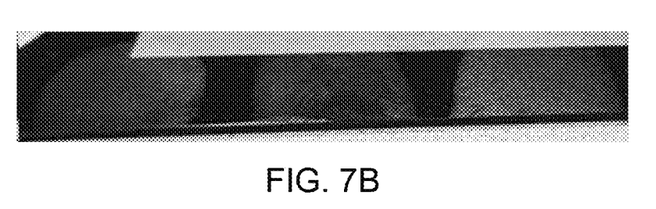
FIG. 7B shows an anti-fingerprint film according to a comparative example.

However, as shown in FIG. 7B, the film having surface energy of 21 dyne/cm did not exhibit superior anti-fingerprint properties, as visually observed. Here, FIG. 7B shows the anti-fingerprint film according to a comparative example.

Therefore, the anti-fingerprint films according to various exemplary embodiments the present disclosure was capable of maintaining the transparency of an existing transparent film without damage to the appearance thereof, ensuring reliability suitable for automobile interior parts, and maintaining anti-fingerprint properties after durability evaluation (heat resistance, moisture resistance).

As is apparent from the above description, an anti-fingerprint film according to various exemplary embodiments of the present disclosure includes an outermost layer to which a fluorine-based compound is added, and as such, the attachment area of fingerprints composed of water and oil can be reduced by virtue of the outermost layer having high water and oil repellency, thereby lowering fingerprint visibility.

In addition, a method of producing the anti-fingerprint film according to various exemplary embodiments of the present disclosure can improve economical processing efficiency by reducing the producing cost through a wet process in a roll-to-roll continuous manner.

In addition, the method of producing the anti-fingerprint film according to various exemplary embodiments of the present disclosure can minimize defect rates under optimal conditions in a dry process using ion beam plasma.

The effects of the present disclosure are not limited to the above-mentioned effects. It should be understood that the effects of the present disclosure include all effects that can be inferred from the description of the present disclosure.

Although exemplary embodiments of the present disclosure have been described with reference to the accompanying drawings, those skilled in the art will appreciate that the present disclosure may be embodied in other specific forms without changing the technical spirit or essential features thereof. Thus, the embodiments described above should be understood to be non-limiting and illustrative in every way.

What is claimed is:

1. An anti-fingerprint film, comprising:
   a base layer; and
   an outermost layer disposed on the base layer and comprising a fluorine-based compound,
   wherein the base layer comprises an amount of about 15 to 25 wt % of a silane-based coupling agent and an amount of about 75 to 85 wt % of activated carbon, based on the total weight of the base layer; and
   wherein the outermost layer comprises an amount of about 0.1 to 1 wt % of the fluorine-based compound, an amount of about 1 to 10 wt % of nonafluorobutyl ether, an amount of about 20 to 30 wt % of iron, an amount of about 60 to 70 wt % of stainless steel, and an amount of about 1 to 3.5 wt % of an additive, based on the total weight of the outermost layer.

2. The anti-fingerprint film of claim 1, wherein the anti-fingerprint film further comprises:
   a printing layer disposed under the base layer;
   a binder layer disposed under the printing layer; and
   a film layer disposed under the binder layer.

3. The anti-fingerprint film of claim 1, wherein the base layer comprises a polycarbonate (PC) film, a poly(methyl methacrylate) (PMMA) film, a polycarbonate/poly(methyl methacrylate) coextrusion film, a polyethylene terephthalate (PET)-based film or combinations thereof.

4. The anti-fingerprint film of claim 1, wherein the fluorine-based compound comprises an ultraviolet (UV) curable resin.

5. The anti-fingerprint film of claim 1, wherein the fluorine-based compound comprises a copolymer of perfluoropolyether (PFPE) and (meth)acrylate.

6. The anti-fingerprint film of claim 1, wherein the fluorine-based compound comprises 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, α-trifluoromethyl methacrylate, α-trifluoroethyl methacrylate, or combinations thereof.

7. The anti-fingerprint film of claim 1, wherein the anti-fingerprint film further comprises:
   a hard coating layer disposed under the base layer;
   a transparent film layer disposed under the hard coating layer;
   a printing layer disposed under the transparent film layer;
   a binder layer disposed under the printing layer; and
   a film layer disposed under the binder layer.

8. The anti-fingerprint film of claim 1, wherein the fluorine-based compound comprises perfluoropolyether (PFPE).

9. An anti-fingerprint film, comprising:
   a base layer; and
   an outermost layer disposed on the base layer and comprising a fluorine-based compound,
   wherein the outermost layer comprises an amount of about 15 to 45 wt % of a urethane acrylate oligomer, an amount of about 10 to 70 wt % of an acrylate monomer, an amount of about 0.07 to 3 wt % of the fluorine-based compound, an amount of about 0.03 to 0.4 wt % of a silicone resin, an amount of about 0.08 to 3 wt % of a nanometal oxide, an amount of about 0.7 to 15 wt % of a photoinitiator, and an amount of about 0.15 to 1.5 wt % of a stabilizer, based on the total weight of the outermost layer,
   wherein the acrylate monomer comprises a first acrylate monomer, a second acrylate monomer, and a third acrylate monomer,
   wherein the first acrylate monomer has 6 to 30 functional groups and included in amount of 5 to 34 wt % in the outermost layer,
   wherein the second acrylate monomer has 4 to 20 functional groups and included 4 to 28 wt % in the outermost layer, and
   wherein the third acrylate monomer has 2 to 3 functional groups and included 0.8 to 10 wt % in the outermost layer.

* * * * *